Sept. 30, 1947. H. P. PHILLIPS 2,428,177

PISTON RING AND PISTON AND PISTON RING ASSEMBLY

Filed Sept. 2, 1944

INVENTOR.
HAROLD P. PHILLIPS
BY Carl D Chappell
ATTORNEYS.

Patented Sept. 30, 1947

2,428,177

UNITED STATES PATENT OFFICE 2,428,177

PISTON RING AND PISTON AND PISTON RING ASSEMBLY

Harold P. Phillips, Hastings, Mich., assignor to Hastings Manufacturing Company, Hastings, Mich., a corporation of Michigan Application September 2, 1944, Serial No. 552,466

5 Claims. (Cl. 309—29)

This invention relates to improvements in piston ring and piston and piston ring assembly.

The main objects of this invention are:

First, to provide a piston ring of the cast iron type having substantially increased tension as compared to the commonly used cast iron piston rings.

Second, to provide a piston ring having these advantages which when installed in a piston ring groove is supported against rotative movement.

Third, to provide a piston ring having these advantages which may be readily installed in pistons having standard types of grooves with a slight change or modification thereof easily effected by a mechanic.

Objects relating to details and economies of the invention will appear from the description to follow. The invention is defined in the claims.

A preferred embodiment of the invention is illustrated in the accompanying drawing, in which.

Figure 1:
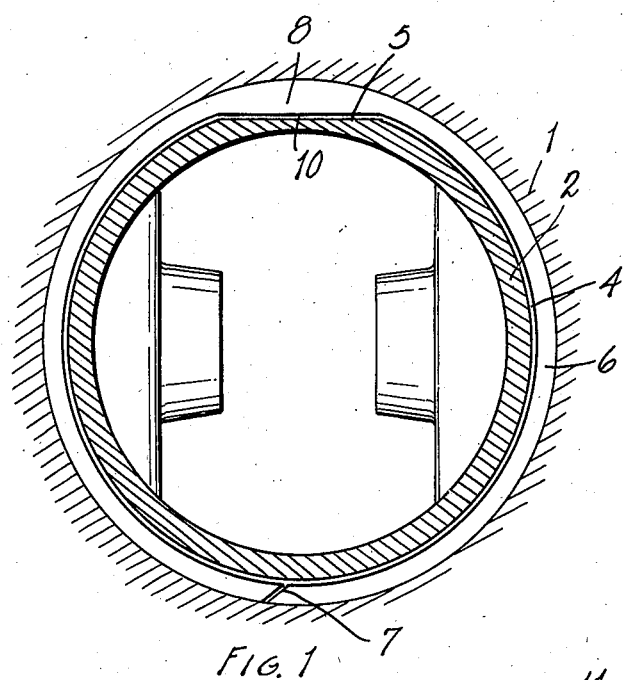
Fig. 1 is a fragmentary transverse section of a piston through the groove thereof with my improved piston ring installed therein and in operative relation to a cylinder, the latter being conventionally illustrated.

In the accompanying drawing, 1 represents a cylinder and 2 the bore thereof. The piston 3 is provided with a piston ring groove 4 having a flattened chord-like segmental portion 5 in the bottom thereof.

My improved piston ring 6 has a split 7, the ends of the ring illustrated being cut on the bevel. Opposite the split, I provide a chord-like heel portion 8 of substantial length, that illustrated being of approximately 40° in length. This chord-like heel portion is of substantially greater radial width for a substantial portion of its length than the segmental portions 9 of the ring extending from the ends of the heel portion 8 to the split. These segmental portions 9 are of uniform radial width.

Figure 3:
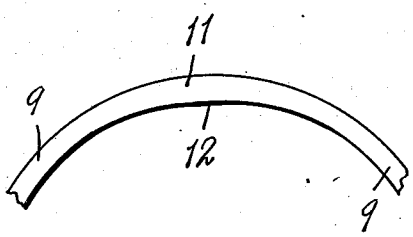
Fig. 3 is a fragmentary plan view of a modified form or embodiment of my invention.

The heel portion 8 preferably has a flat inner edge 10 although in the embodiment of the ring of my invention shown in Fig. 3 the heel portion 11 has a curved inner edge 12 which merges into the segmental portions 9.

This segmental or chord-like heel portion 8 performs the function of anchoring the ring against rotative movement when the ring is installed with a piston having a groove with a flattened bottom portion 5.

The piston may be manufactured with this flattened portion 5 in the bottom of the ring grooves but in using the rings as replacement rings the bottom of the groove can be flattened by filing or by use of a suitable tool.

Rings embodying my invention are of substantially increased tension as compared to rings of the same sizes and radial and axial dimensions not embodying my invention. It will be understood that the length of the segmental heel portion varies with the size or diameter of the ring and to some extent to the tension desired. A segmental heel portion of approximately 40° length seems to meet conditions for the most generally used sizes of automotive piston rings. As another example, in a ring having a diameter of 3½", the chord or segment would be about 1½" in length and would increase the radial width of the chord or segment at the center approximately ⅛"—this in a ring in which the radial thickness of the remainder of the ring is approximately .150.

Figure 2:
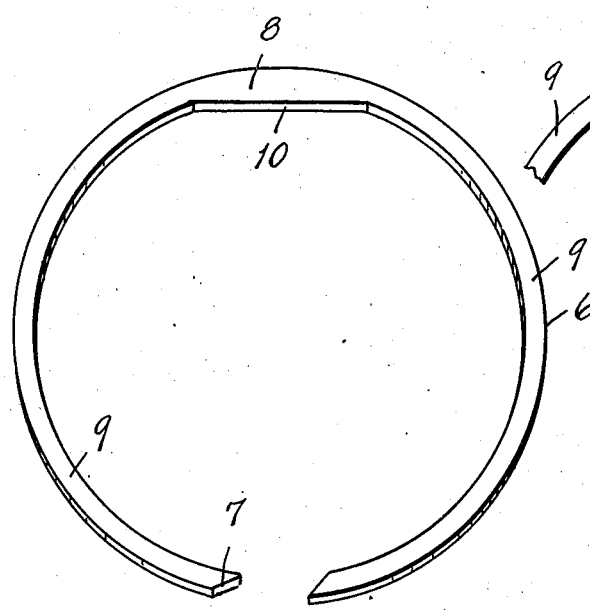
Fig. 2 is a perspective view of my improved piston ring.

In the embodiment of my invention shown in Fig. 3 in which the inner edge of the heel portion is continuously concavedly curved, the length of the segment may be somewhat greater than when the heel portion has a straight inner edge, as shown in Fig. 2.

I have not attempted to illustrate or describe other embodiments or adaptations of my invention as it is believed that this disclosure will enable those skilled in the art to embody or adapt my invention as may be desired.

Having thus described my invention, what I claim as new and desire to secure by Letters Patent is:

1. A split resilient normally expanded piston ring having a curved cylinder wall engaging periphery and a chord-like heel portion of substantial length and of substantially greater radial width for a substantial portion of its length than the segmental portions of the ring extending from the ends of such heel portion to the split, such segmental portions being of uniform radial width.

2. A split resilient normally expanded piston ring having a segmental heel portion of approximately 40° in length opposite the split thereof of substantially greater radial width throughout a substantial portion thereof than the remaining portions of the ring extending from the ends of said heel portion, said segmental heel portion gradually progressively increasing in radial thickness from the ends thereof to substantially the middle thereof, and being continuously concave on the inner side thereof.

3. A split resilient normally expanded piston ring having a curved cylinder wall engaging periphery, and a chord-like heel portion opposite the split thereof of substantially greater radial width at the center thereof than the remaining portions of the ring extending from the ends of said heel portion, the inner edge of said chord-like heel portion being substantially straight.

4. A split spring tensioned normally expanded piston ring having a segmental heel portion opposite the split thereof of substantially greater radial width throughout a substantial portion of its length than the remaining portions of the ring extending from the ends of said heel portion, said segmental heel portion gradually progressively increasing in radial thickness from the ends thereof to substantially the middle thereof and extending a substantial distance circumferentially of the ring to facilitate imparting a certain degree of cylinder wall engaging tension to the ring, and being continuously concave on the inner side thereof.

5. The combination with a piston having a piston ring groove with a chord-like flattened portion in the bottom thereof, of a split resilient piston ring having a chord-like heel portion opposite the split thereof of substantially greater radial thickness than the segmental portions of the ring at each side of said chord-like portion, said chord-like portion having a substantially straight inner edge and being of a length to span the flattened bottom portion of the piston ring groove and coacting therewith to prevent rotation of the ring within the piston ring groove.

HAROLD P. PHILLIPS.

REFERENCES CITED

The following references are of record in the file of this patent:

UNITED STATES PATENTS

| Number | Name | Date |
|---|---|---|
| 2,248,779 | Phillips | July 8, 1941 |
| 1,357,949 | Brooks | Nov. 9, 1920 |
| 1,750,356 | Ragsdale | Mar. 11, 1930 |
| 1,777,501 | Niethamer | Oct. 7, 1930 |
| 2,192,926 | Meyer | Mar. 12, 1940 |
| 1,626,750 | Panyard | May 3, 1927 |
| 1,179,097 | Hartog | Apr. 11, 1916 |